(12) United States Patent
Bookbinder et al.

(10) Patent No.: US 10,501,364 B2
(45) Date of Patent: Dec. 10, 2019

(54) ION EXCHANGEABLE GLASSES HAVING HIGH HARDNESS AND HIGH MODULUS

(71) Applicant: CORNING INCORPORATED, Corning, NY (US)

(72) Inventors: Dana Craig Bookbinder, Corning, NY (US); Timothy Michael Gross, Waverly, NY (US)

(73) Assignee: CORNING INCORPORATED, Corning, NY (US)

(*) Notice: Subject to any disclaimer, the term of this patent is extended or adjusted under 35 U.S.C. 154(b) by 603 days.

(21) Appl. No.: 14/082,673

(22) Filed: Nov. 18, 2013

(65) Prior Publication Data
US 2014/0141226 A1 May 22, 2014

Related U.S. Application Data

(60) Provisional application No. 61/728,944, filed on Nov. 21, 2012.

(51) Int. Cl.
*C03C 3/095* (2006.01)
*C03C 3/068* (2006.01)
*C03C 21/00* (2006.01)

(52) U.S. Cl.
CPC .............. *C03C 3/095* (2013.01); *C03C 3/068* (2013.01); *C03C 21/002* (2013.01); *C03C 2201/3411* (2013.01); *Y10T 428/315* (2015.01)

(58) Field of Classification Search
CPC .................. C03C 3/095; C03C 21/002; C03C 2201/3411
See application file for complete search history.

(56) References Cited

U.S. PATENT DOCUMENTS

| 5,011,677 A | 4/1991 | Day et al. |
| 6,332,338 B1 | 12/2001 | Hashimoto et al. ......... 65/29.21 |
| 6,387,510 B1 | 5/2002 | Nakashima et al. .......... 428/426 |

(Continued)

FOREIGN PATENT DOCUMENTS

| EP | 0917135 | 8/2006 |
| JP | 2001-172043 | 6/2001 |

(Continued)

OTHER PUBLICATIONS

JP2004244226A English translation, Sep. 2, 2004.*

(Continued)

*Primary Examiner* — Scott R. Walshon
*Assistant Examiner* — Jasper Saberi
(74) *Attorney, Agent, or Firm* — Kevin M. Johnson

(57) ABSTRACT

Ion-exchangeable glasses having high hardness and high elastic modulus. The base cover glass formulation includes $Na_2O$, $Y_2O_3$, $Al_2O_3$, and $SiO_2$. The glasses may further include $P_2O_5$, $B_2O_3$, and any of the alkali, alkaline earth, and rare earth oxides, as well as other divalent metal oxides. The ion-exchangeable glasses offer higher hardness, which provides more resistance to micro-ductile scratching damage. Ion-exchange of these glasses increases their resistance to cracking caused by frictive damage and increases retained strength following formation of surface damage.

50 Claims, 1 Drawing Sheet

(56) References Cited

U.S. PATENT DOCUMENTS

| | | | |
|---|---|---|---|
| 6,451,720 B1 | 9/2002 | Kishimoto et al. | |
| 6,465,105 B1 | 10/2002 | Johnson et al. | 428/426 |
| 6,819,526 B2 | 11/2004 | Kataoka et al. | |
| 8,187,715 B2 | 5/2012 | Danielson et al. | |
| 2004/0063564 A1 | 4/2004 | Kawai et al. | 501/68 |
| 2007/0042894 A1* | 2/2007 | Aitken | C03C 3/095 501/64 |
| 2007/0071956 A1* | 3/2007 | Zou | C03B 17/04 428/220 |
| 2009/0215607 A1* | 8/2009 | Dejneka | C03C 1/004 501/27 |
| 2010/0047521 A1* | 2/2010 | Amin | C03C 3/083 428/141 |
| 2010/0167091 A1* | 7/2010 | Tachiwana | C03C 3/087 428/828 |
| 2010/0190038 A1* | 7/2010 | Osakabe | C03C 21/002 428/846.2 |
| 2012/0107647 A1* | 5/2012 | Matsumoto | C03C 3/087 428/846.9 |
| 2015/0132579 A1* | 5/2015 | Guo | C03C 3/095 428/410 |

FOREIGN PATENT DOCUMENTS

| | | | |
|---|---|---|---|
| JP | 2004244226 A * | 9/2004 | |
| WO | 200134531 A1 | 5/2001 | |
| WO | 200204371 A1 | 1/2002 | |
| WO | WO-0204371 A1 * | 1/2002 | C03C 3/083 |
| WO | 2013/181122 | 12/2013 | |

OTHER PUBLICATIONS

WO02/04371A1 English translation (Year: 2002).*

Makishima et al.; "Thermal Expansions and Chemical Durabilities of Yttria-Aluminosilicate Glasses Containing $Na_2O$ and $ZrO_2$"; Journal of American Ceramic Society, 74 [2], 1991; pp. 428-430.

European Patent Office; International Search Report; dated Feb. 28, 2014; pp. 1-5.

English Translation of Japanese Office Action JP2015544104 dated Oct. 17, 2017; 4 Pages; Japanese Patent Office.

* cited by examiner

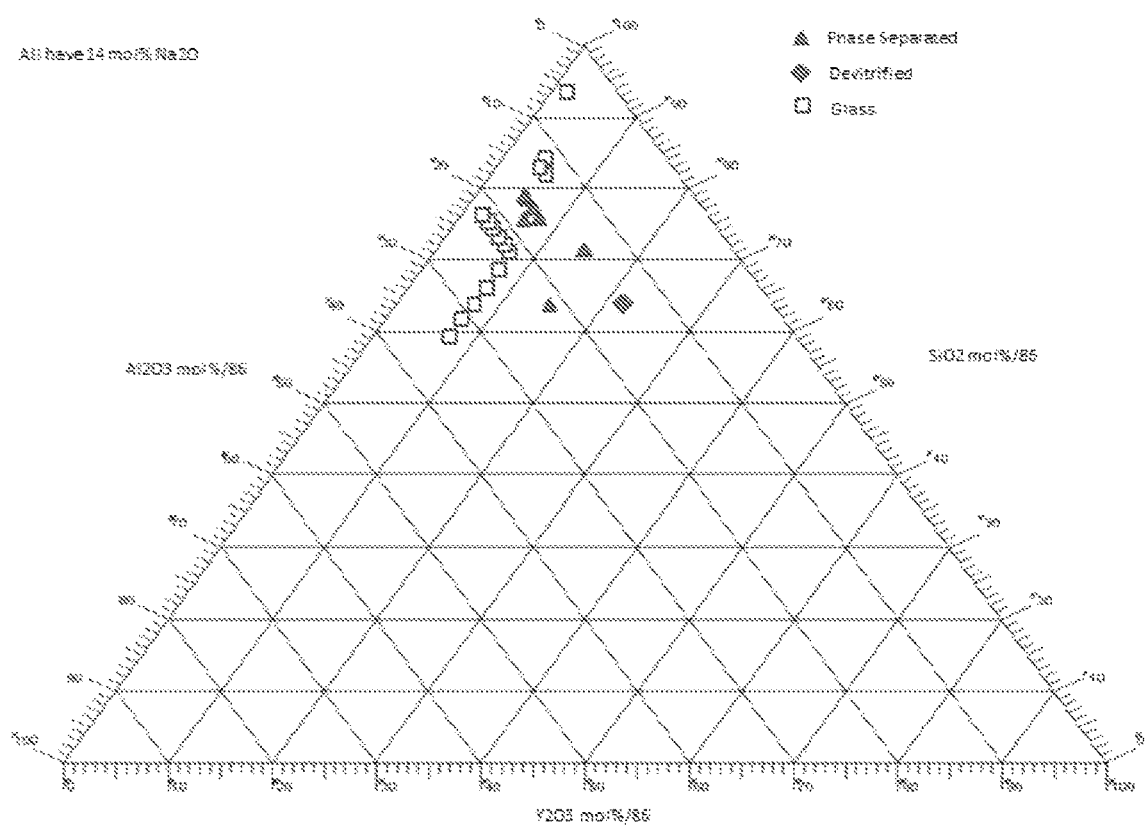

US 10,501,364 B2

ION EXCHANGEABLE GLASSES HAVING HIGH HARDNESS AND HIGH MODULUS

This application claims the benefit of priority under 35 U.S.C. 119 § of U.S. Application Ser. No. 61/728,944 filed on Nov. 21, 2012 the content of which is relied upon and incorporated herein by reference in its entirety.

BACKGROUND

The disclosure relates to ion exchangeable alkali aluminosilicate glasses. More particularly, the disclosure relates to yttria-containing alkali aluminosilicate glasses. Even more particularly, the disclosure describes examples of yttria-containing alkali aluminosilicate glasses having high levels of hardness and elastic modulus.

Hard transparent cover materials such as single crystal sapphire are sometimes used as protective layers in glass articles such as cover glass or display windows for consumer electronic devices. While hard coatings can provide suitable increases in hardness, such coatings are susceptible to contact delamination.

SUMMARY

Ion-exchangeable glasses having high hardness and high elastic modulus are provided. The base cover glass formulation includes $Na_2O$, $Y_2O_3$, $Al_2O_3$, and $SiO_2$. The glasses may further include $P_2O_5$, $B_2O_3$, $TiO_2$, and any of the alkali, alkaline earth, and rare earth oxides, as well as other divalent metal oxides. The ion-exchangeable glasses described herein offer higher hardness, which provides more resistance to micro-ductile scratching damage. Ion-exchange of these glasses increases their resistance to cracking caused by frictive damage and increases retained strength following formation of surface damage.

Accordingly, one aspect of the disclosure is to provide an ion exchangeable glass comprising $SiO_2$, $Al_2O_3$, $Na_2O$, and up to about 7 mol % $Y_2O_3$, and having a molar ratio [$Al_2O_3$ (mol %)/$Y_2O_3$ (mol %)] of greater than 2.

A second aspect provides a glass comprising $SiO_2$, $Al_2O_3$, $Na_2O$, and $Y_2O_3$, and having a molar ratio [$Al_2O_3$(mol %)/$Y_2O_3$(mol %)] of greater than 2 and a Young's modulus of at least 75 GPa.

A third aspect of the disclosure is to provide a glass comprising $SiO_2$, $Al_2O_3$, $Na_2O$, and $Y_2O_3$, and having a molar ratio [$Al_2O_3$(mol %)/($Y_2O_3$(mol %))] of at least 2 and a 200 gf Vickers hardness of at least 660 $kgf/mm^2$.

These and other aspects, advantages, and salient features of the present disclosure will become apparent from the following detailed description, the accompanying drawings, and the appended claims.

BRIEF DESCRIPTION OF THE DRAWINGS

FIG. 1 is the ternary phase diagram for yttria alkali aluminosilicate glasses

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Referring to the drawings in general and to FIG. 1 in particular, it will be understood that the illustrations are for the purpose of describing a particular embodiment and are not intended to limit the invention thereto.

Described herein are ion exchangeable and ion exchanged glasses having high hardness and high elastic modulus. These glasses comprise $SiO_2$ (silica), $Al_2O_3$ (alumina), $Na_2O$, and $Y_2O_3$ (yttria), wherein the molar ratio $Al_2O_3$(mol %)/$Y_2O_3$(mol %) of the glass is greater than 2 and, in some embodiments, greater than 2.1. While not as hard as single crystal sapphire, the ion exchangeable glasses described herein are capable of being ion exchanged to achieve high surface compression and a deep depth of compressive layer. Ion exchange increases the resistance of the glass to cracking caused by fictive damage and increases the retained strength of the glass following formation of surface damage. The ion exchangeable glass is harder than many ion exchangeable or ion exchanged alkali aluminosilicate glasses, and is resistant to microductile scratching.

FIG. 1 is an isotherm of the ternary phase diagram for yttria sodium aluminosilicate glasses, showing compositions of samples that either formed glasses, separated into multiple phases, or devitrified. Each of the samples plotted in FIG. 1 contains 14 mol % $Na_2O$. The $SiO_2$, $Al_2O_3$, and $Y_2O_3$ components shown in FIG. 1 are divided by 86 in order to represent compositions on the ternary phase diagram. As seen in FIG. 1, sodium aluminosilicate glasses that contain yttria have large compositional ranges or areas were either phase separation or devitrification readily occur. In some embodiments, the glass described herein comprises up to 7 mol % $Y_2O_3$, thus avoiding such devitrification.

As seen in FIG. 1, phase separation appears to readily occur in those compositions in which the molar ratio of $Na_2O$ to alumina ($Na_2O$(mol %)/$Al_2O_3$(mol %)) is 1:1, with the degree of such phase separation increasing with increasing yttria content. Glasses in which either $Na_2O$ is present in excess with respect to alumina or alumina is present in excess with respect to $Na_2O$ form high quality (i.e., highly transparent, clear) homogeneous glass. Accordingly, in order to avoid such phase separation, the glasses described herein, in some embodiments, the ratio ($Na_2O$(mol %)/$Al_2O_3$(mol %)) is greater than 1 and, in other embodiments, the ratio ($Na_2O$(mol %)/$Al_2O_3$(mol %)) is less than 1.

The glasses described herein, in some embodiments, comprise from about 40 mol % to about 82 mol % $SiO_2$ and, in some embodiments, from about 50 mol % to about 80 mol % $SiO_2$. The glasses described herein also comprise from about 4 mol % to about 40 mol % $Al_2O_3$ and, in some embodiments, from about 4 mol % to about 30 mol % $Al_2O_3$. The glasses described herein also comprise from about 4 mol % to about 26 mol % $Na_2O$, and, in some embodiments, from about 12.5 mol % to about 18 mol % $Na_2O$. Finally, in some embodiments, the glasses described herein comprise from about 1.5 mol % to about 7 mol % $Y_2O_3$. In some embodiments, the glass comprises: from about 40 mol % to about 82 mol % $SiO_2$; from about 4 mol % to about 40 mol % $Al_2O_3$; from about 4 mol % to about 26 mol % $Na_2O$; and from about 1.5 mol % to about 7 mol % $Y_2O_3$. In other embodiments, the glass comprises from about 50 mol % to about 80 mol % $SiO_2$; from about 4 mol % to about 30 mol % $Al_2O_3$; from about 12.5 mol % to about 18 mol % $Na_2O$; and from about 1.5 mol % to about 7 mol % $Y_2O_3$.

In some embodiments, the glass may further comprise at least one alkali metal oxide other than $Na_2O$; i.e., $Li_2O$, $K_2O$, $Rb_2O$, and/or $Cs_2O$. In certain embodiments, the glass may be substantially free of lithia ($Li_2O$). In some embodiments, the glass may further comprise at least one alkaline earth oxide and/or other oxides of divalent metals (e.g., ZnO). The glass, in some embodiments, may also further comprise at least one additional rare earth (i.e., La, Ce, Pr, Nd, Pm, Sm, Eu, Gd, Tb, Dy, Ho, Er, Tm, Yb, Lu, Sc) oxide such as, for example, $La_2O_3$ and/or $Sc_2O_3$, other than yttria. In some embodiments, the glass may further comprise at least one of $B_2O_3$, $P_2O_5$, and $TiO_2$.

Examples of the yttria-containing glasses described herein are listed in in Table 1. Values of the $Al_2O_3$/$Y_2O_3$ molar ratio determined for various examples and physical properties (density, molar volume, Young's modulus, shear modulus, Poisson's ratio, strain point, anneal point, and softening point) of these glasses are also listed in Table 1.

In some embodiments, the glass described herein has a viscosity dependence on temperature that enables the glass to be manufactured using down-draw methods, such as fusion draw and slot draw methods, that are known in the art. For example, the glass may have a 160 kP (kilopoise) temperature of about 1154° C., a 200 P temperature of about 1539° C., and a 35 kP temperature of about 1213° C. Alternatively, the glass may be formed by other methods know in the art, such as, for example float and casting methods.

The glass described herein, in some embodiments, may be strengthened by ion exchange. The glasses may, for example, be ion exchanged by immersion in a molten salt bath comprising or consisting essentially of $KNO_3$ at a temperature of about 450° C. for a period of about 24 hours, although other potassium salts (e.g., KCl, $K_2SO_4$, or the like), different temperatures (e.g., 300° C.-500° C.), different ion exchange times (e.g., 1-48 hours), and successive immersion in multiple ion exchange baths may be used. In the ion exchange process, a portion of the sodium ions at or near the surface of the glass are exchanged for potassium ions in the salt bath to a depth in the glass, resulting in a layer of the glass that is under compressive stress (also referred to as the compressive layer) and extends from the surface to a depth (depth of layer) into the bulk of the glass. As a result of the exchange of $K^+$ ions for $Na^+$ ions in the glass, the compressive layer may be enriched in potassium. In some embodiments, the potassium concentration has a maximum value at the surface, and decreases following a modified error function.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC is in turn measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. Multiple images are obtained using the FSM-6000 and combined in order to access the higher refractive indices of the yttria-containing glasses.

Unlike scratch resistant coatings such as diamond-like carbon and sapphire, which provide damage and scratch resistance above the glass surface, and are prone to delamination, the compressive layer of the glass provides compressive stress at the actual surface of the glass. The glasses described herein may be ion exchanged to produce a compressive layer having a compressive stress of at least about 800 MPa and a depth of layer of at least 40 μm. Table 2 lists compressive stress and depth of layer obtained for glasses listed in Table 1 when ion exchanged at 450° C. in a $KNO_3$ molten salt bath for 24 hours.

The glasses described herein also have strain points that are significantly higher than those observed for other ion exchangeable alkali aluminosilicate glasses. In one embodiment, the glass has a strain point of at least about 700° C. and, in some embodiments, at least about 760° C. In comparison, glass code 2317, manufactured by Corning® Incorporated, has a strain point of less than about 640° C.

The glasses described herein possess enhanced hardness and Young's modulus. Hardness values typically decrease as the indentation cracking resistance increases, and the hardness of the glass typically decreases with decreasing packing density, which is also reflected in low modulus values. While lower packing density allows for a large degree of deformation prior to the formation of strength-limiting cracks, it is also detrimental to the resistance of the glass to small, groove-like scratches in the microductile regime. The microductile scratch regime is defined as the presence of a permanent scratch groove without any lateral cracks intersecting the surface or any surface radial cracks. This type of scratch occurs during contacts which displace small volumes of glass. The increased hardness of the yttria doped glasses makes the width and/or depth of the scratch smaller for a given contact when compared to softer glasses. The glasses described herein have a Young's modulus, which increases the resistance of the glass to such small, groove-like scratches, of at least 75 gigaPascals (GPa) and, in some embodiments, at least 80 GPa. In comparison, code 2317 glass and related alkali aluminosilicate glasses manufactured by Corning® Incorporated, typically have a Young's modulus of about 75 GPa or less. The addition of rare earth metals such as yttrium to the base sodium aluminosilicate glass base composition result in a much more highly packed glass network, which results in greater hardness and Young's modulus.

Whereas ion-exchanged alkali aluminosilicate glasses typically have 200 grams force (gf) Vickers hardness values of about 650 kgf/m², the glasses described herein have 200 grams force (gf) Vickers hardness values of at least 750 kgf/mm³ and, in some embodiments, at least 790 kgf/mm² when ion exchanged. When unstrengthened (i.e., not ion exchanged), the glasses described herein have a 200 gf Vickers hardness of at least 660 kgf/mm² Table 3 lists Vickers hardness values obtained for selected glasses listed in Table 1, and includes data for glasses that were ion exchanged as well as for glasses that were not ion exchanged.

The glasses described herein, in some embodiments, may be used as cover glass or windows for displays on electronic devices such as, but not limited to, entertainment devices, laptop computers, tablets, and the like. For such applications, the glass is formed into a planar or three dimensional sheets and is typically ion exchanged to provide the desired level of surface compressive stress. In some embodiments, the glass has a thickness in a range from about 0.1 mm to about 1.5 mm, in other embodiments, from about 0.2 mm to about 1.0 mm, in still other embodiments, from about 0.2 mm to about 0.7 mm, and in still other embodiments, from about 0.2 mm to about 0.5 mm.

Vickers indentation radial cracking thresholds measured for glasses listed in Table 1 that were ion exchanged are listed in Table 2. Vickers indentation radial cracking threshold measurements described herein were performed by applying and then removing an indentation load to the glass surface at 0.2 mm/min. The indentation maximum load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

TABLE 1

Examples of ion-exchangeable, yttria-containing sodium aluminosilicate glasses.

|  | ANL | ANM | ANN | ANO | ANP | ANQ |
|---|---|---|---|---|---|---|
| Batched Composition (mol %) | | | | | | |
| $SiO_2$ | 61 | 59 | 57 | 55 | 53 | 51 |
| $Al_2O_3$ | 18.5 | 20.5 | 22.5 | 24.5 | 26.5 | 28.5 |
| $Y_2O_3$ | 6.5 | 6.5 | 6.5 | 6.5 | 6.5 | 6.5 |
| $Na_2O$ | 14 | 14 | 14 | 14 | 14 | 14 |
| molar ratio $Al2O_3/Y_2O_3$ | 2.8 | 3.2 | 3.5 | 3.8 | 4.1 | 4.4 |

TABLE 1-continued

Examples of ion-exchangeable, yttria-containing sodium aluminosilicate glasses.

| Batched Composition (wt %) | | | | | | |
|---|---|---|---|---|---|---|
| $SiO_2$ | 46.5 | 44.5 | 42.5 | 40.6 | 38.7 | 36.9 |
| $Al_2O_3$ | 23.9 | 26.2 | 28.5 | 30.7 | 32.9 | 35.0 |
| $Y_2O_3$ | 18.6 | 18.4 | 18.2 | 18.0 | 17.9 | 17.7 |
| $Na_2O$ | 11.0 | 10.9 | 10.8 | 10.7 | 10.6 | 10.4 |
| Density (g/cm³) | 2.767 | 2.772 | 2.779 | 2.789 | 2.808 | 2.797 |
| Molar Volume (mol/cm³) | 28.50 | 28.76 | 28.98 | 29.18 | 29.28 | 29.70 |
| Young's modulus (GPa) | 82.6 | 83.7 | 86.5 | 86.4 | 90 | 88.4 |
| Shear modulus (GPa) | 33.4 | 34.1 | 34.8 | 35.1 | 36.3 | 35.8 |
| Poisson's Ratio | 0.238 | 0.227 | 0.243 | 0.229 | 0.239 | 0.235 |
| BBV Strain Pt. (° C.) | 761.3 | 762.1 | 763.6 | 761.9 | 765.8 | 765.4 |
| BBV Anneal Pt. (°C) | 811.1 | 809 | 810.3 | 807.9 | 809 | 810.1 |
| PPV softening Pt. (° C.) | 1009.6 | 999.1 | 994.5 | 992.3 | 985.3 | 988.9 |

|  | ANU (ANL repeat) | ANV | ANW | ANX | ANY | ANZ |
|---|---|---|---|---|---|---|
| Batched Composition (mol %) | | | | | | |
| $SiO_2$ | 61 | 62 | 63 | 64 | 65 | 66 |
| $Al_2O_3$ | 18.5 | 18.5 | 18.5 | 18.5 | 18.5 | 18.5 |
| $Y_2O_3$ | 6.5 | 5.5 | 4.5 | 3.5 | 2.5 | 1.5 |
| $Na_2O$ | 14 | 14 | 14 | 14 | 14 | 14 |
| molar ratio $Al2O_3/Y_2O_3$ | 2.8 | 3.4 | 4.1 | 5.3 | 7.4 | 12.3 |
| Batched Composition (wt %) | | | | | | |
| $SiO_2$ | 46.5 | 48.2 | 50.1 | 52.0 | 54.1 | 56.2 |
| $Al_2O_3$ | 23.9 | 24.4 | 25.0 | 25.5 | 26.1 | 26.7 |
| $Y_2O_3$ | 18.6 | 16.1 | 13.4 | 10.7 | 7.8 | 4.8 |
| $Na_2O$ | 11.0 | 11.2 | 11.5 | 11.7 | 12.0 | 12.3 |

|  | AOA | AOB | AOC | AOD (ANL repeat 2) | AOE (ANV repeat) |
|---|---|---|---|---|---|
| Batched Composition (mol %) | | | | | |
| $SiO_2$ | 64.8 | 72.5 | 80.23 | 61 | 62 |
| $Al_2O_3$ | 15.7 | 10.0 | 4.27 | 18.5 | 18.5 |
| $Y_2O_3$ | 5.5 | 3.5 | 1.5 | 6.5 | 5.5 |
| $Na_2O$ | 14.0 | 14.0 | 14 | 14 | 14 |
| molar ratio $Al2O_3/Y_2O_3$ | 2.8 | 2.8 | 2.8 | 2.8 | 3.4 |

TABLE 1-continued

Examples of ion-exchangeable, yttria-containing sodium aluminosilicate glasses.

Batched Composition (wt %)

| | | | | | |
|---|---|---|---|---|---|
| SiO$_2$ | 51.3 | 62.0 | 74.6 | 46.5 | 48.2 |
| Al$_2$O$_3$ | 21.0 | 14.4 | 6.7 | 23.9 | 24.4 |
| Y$_2$O$_3$ | 16.3 | 11.2 | 5.2 | 18.6 | 16.1 |
| Na$_2$O | 11.4 | 12.3 | 13.4 | 11.0 | 11.2 |
| Density (g/cm$^3$) | | | 2.759 | | |
| Molar Volume (mol/cm$^3$) | | | 28.59 | | |

| | AOF (ANW repeat) | AOG (ANX repeat) | AON | AOO |
|---|---|---|---|---|
| Batched Composition (mol %) | | | | |
| SiO$_2$ | 63 | 64 | 70.5 | 71.5 |
| Al$_2$O$_3$ | 18.5 | 18.5 | 11 | 11 |
| Y$_2$O$_3$ | 4.5 | 3.5 | 4.5 | 3.5 |
| Na$_2$O | 14 | 14 | 14 | 14 |
| molar ratio Al2O3/Y$_2$O$_3$ | 4.1 | 5.3 | 2.4 | 3.1 |
| Batched Composition (wt %) | | | | |
| SiO$_2$ | 50.1 | 52.0 | 58.5 | 60.7 |
| Al$_2$O$_3$ | 25.0 | 25.5 | 15.5 | 15.9 |
| Y$_2$O$_3$ | 13.4 | 10.7 | 14.0 | 11.2 |
| Na$_2$O | 11.5 | 11.7 | 12.0 | 12.3 |
| Density (g/cm$^3$) | 2.661 | 2.608 | 2.63 | 2.576 |
| Molar Volume (mol/cm$^3$) | 28.39 | 28.34 | 27.54 | 27.47 |

TABLE 2

Compressive stress, depth of layer, Vickers indentation radial cracking thresholds, and diffusivities obtained for selected glasses listed in Table 1 when ion exchanged at 450° C. in a KNO$_3$ molten salt bath for 24 hours.

| Compressive stress measured using SOC = 31.8 | ANL | ANM | ANN | ANO | ANP | ANQ |
|---|---|---|---|---|---|---|
| 450° C. 24 hr KNO$_3$ Ion-Exchange CS (MPa) | 884 | 889 | 860 | 851 | | 772 |
| 450° C. 24 hr KNO$_3$ ion-exchange DOL (microns) | 71 | 41 | 38 | 24 | | 20 |
| 450° C. 24 hr KNO$_3$ Ion-Exchange indentation radial cracking threshold (kgf) | 6-7 | 4-5 | 4-5 | 2-3 | 2-3 | 2-3 |
| 450° C. 24 hr K$^+$/Na$^+$ ion-exchange Diffusivity (cm$^2$/s) | 7.44 × 10$^{-11}$ | 2.48 × 10$^{-11}$ | 2.13 × 10$^{-11}$ | 8.50 × 10$^{-12}$ | | 5.91 × 10$^{-12}$ |

TABLE 3

Vickers hardness values obtained for selected glasses listed in Table 1.

| | ANL | ANM | ANN | ANO | ANP | ANQ |
|---|---|---|---|---|---|---|
| Vickers Hardness (kgf/mm$^2$) non-IX 200 gf load | 674 | 666 | 674 | 673 | 687 | 670 |
| Vickers Hardness (kgf/mm$^2$) IX 200 gf load | 812 | 795 | 803 | 795 | 797 | 804 |

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A glass comprising SiO$_2$, at least 18 mol % Al$_2$O$_3$, about 14 mol % Na$_2$O, and from 2.5 mol % to about 6.5 mol % Y$_2$O$_3$, the glass having a molar ratio [Al$_2$O$_3$(mol %)/Y$_2$O$_3$ (mol %)] of greater than 2.5, wherein the glass has a Young's modulus of at least 75 GPa and is ion exchangeable.

2. The glass of claim 1, wherein the glass comprises: from about 40 mol % to about 82 mol % SiO$_2$; from 18 mol % to about 40 mol % Al$_2$O$_3$; about 14 mol % Na$_2$O; and from 2.5 mol % to about 6.5 mol % Y$_2$O$_3$.

3. The glass of claim 1, wherein the glass comprises: from about 50 mol % to about 80 mol % SiO$_2$; from 18 mol % to about 30 mol % Al$_2$O$_3$; about 14 mol % Na$_2$O; and from 2.5 mol % to about 6.5 mol % Y$_2$O$_3$.

4. The glass of claim 1, wherein Al$_2$O$_3$(mol %)/Na$_2$O(mol %)>1.

5. The glass of claim 1, further comprising at least one alkali metal oxide other than Na$_2$O.

6. The glass of claim 1, further comprising at least one divalent metal oxide.

7. The glass of claim 6, wherein the at least one divalent metal oxide comprises at least one of ZnO and one or more alkaline earth oxide.

8. The glass of claim 1, further comprising at least one rare earth oxide other than Y$_2$O$_3$.

9. The glass of claim 1, further comprising at least one of $B_2O_3$, $P_2O_5$, and $TiO_2$.

10. The glass of claim 1, wherein the glass has a strain point of at least 700° C.

11. The glass of claim 1, wherein the glass has a 200 gf Vickers hardness of at least 660 kgf/mm$^2$.

12. The glass of claim 1, wherein the glass is ion exchanged.

13. The glass of claim 12, wherein the ion exchanged glass has a compressive layer extending from a surface of the glass to a depth of layer of at least 40 μm into the glass, wherein the compressive layer has a compressive stress of at least 800 MPa.

14. The glass of claim 13, wherein the compressive layer comprises potassium ions.

15. The glass of claim 12, wherein the ion exchanged glass has a 200 gf Vickers hardness of at least 750 kgf/mm$^2$.

16. The glass of claim 1, wherein the glass has a thickness in a range from about 0.1 mm up to about 1.5 mm.

17. The glass of claim 1, wherein the glass is substantially free of $Li_2O$.

18. A glass comprising $SiO_2$, at least 18 mol % $Al_2O_3$, about 14 mol % $Na_2O$, and from 2.5 mol % to about 6.5 mol % $Y_2O_3$, the glass having a molar ratio $[Al_2O_3(\text{mol \%})/Y_2O_3(\text{mol \%})]$ of greater than 2.5 and a Young's modulus of at least 75 GPa.

19. The glass of claim 18, wherein the glass comprises: from about 40 mol % to about 82 mol % $SiO_2$; from 18 mol % to about 40 mol % $Al_2O_3$; about 14 mol % $Na_2O$; and from 2.5 mol % to about 6.5 mol % $Y_2O_3$.

20. The glass of claim 18, wherein the glass comprises: from about 50 mol % to about 80 mol % $SiO_2$; from 18 mol % to about 30 mol % $Al_2O_3$; about 14 mol % $Na_2O$; and from 2.5 mol % to about 6.5 mol % $Y_2O_3$.

21. The glass of claim 18, wherein $Al_2O_3(\text{mol \%})/Na_2O(\text{mol \%})>1$.

22. The glass of claim 18, further comprising at least one alkali metal oxide other than $Na_2O$.

23. The glass of claim 18, further comprising at least one divalent metal oxide.

24. The glass of claim 18, wherein the at least one divalent oxide comprises at least one of ZnO and one or more alkaline earth oxide.

25. The glass of claim 18, further comprising at least one rare earth oxide other than $Y_2O_3$.

26. The glass of claim 18, further comprising at least one of $B_2O_3$, $P_2O_5$, and $TiO_2$.

27. The glass of claim 18, wherein the glass has a strain point of at least 700° C.

28. The glass of claim 18, wherein the glass has a 200 gf Vickers hardness of at least 660 kgf/mm$^2$.

29. The glass of claim 18, wherein the glass has a Young's modulus of at least 80 GPa.

30. The glass of claim 29, wherein the glass is ion exchanged and has a compressive layer extending from a surface of the glass to a depth of layer of at least 40 μm into the glass, wherein the compressive layer has a compressive stress of at least 800 MPa.

31. The glass of claim 30, wherein the compressive layer comprises potassium ions.

32. The glass of claim 29, wherein the glass is ion exchanged and has a 200 gf Vickers hardness of at least 750 kgf/mm$^2$.

33. The glass of claim 18, wherein the glass has a thickness in a range from about 0.1 mm up to about 1.5 mm.

34. The glass of claim 18, wherein the glass is substantially free of $Li_2O$.

35. A glass comprising $SiO_2$, at least 18 mol % $Al_2O_3$, from about 14 mol % $Na_2O$, and from 2.5 mol % to about 6.5 mol % $Y_2O_3$, the glass having a molar ratio $[Al_2O_3(\text{mol \%})/(Y_2O_3(\text{mol \%}))]$ of greater than 2.5 and a 200 gf Vickers hardness of at least 660 kgf/mm$^2$ and a Young's modulus of at least 75 GPa.

36. The glass of claim 35, wherein the glass comprises: from about 40 mol % to about 82 mol % $SiO_2$; from 18 mol % to about 40 mol % $Al_2O_3$; about 14 mol $Na_2O$; and from 2.5 mol % to about 6.5 mol % $Y_2O_3$.

37. The glass of claim 35, wherein the glass comprises: from about 50 mol % to about 80 mol % $SiO_2$; from 18 mol % to about 30 mol % $Al_2O_3$; about 14 mol % $Na_2O$; and from 2.5 mol % to about 6.5 mol % $Y_2O_3$.

38. The glass of claim 35, wherein $Al_2O_3(\text{mol \%})/Na_2O(\text{mol \%})>1$.

39. The glass of claim 35, further comprising at least one alkali metal oxide other than $Na_2O$.

40. The glass of claim 35, further comprising at least one divalent metal oxide.

41. The glass of claim 40, wherein the at least one divalent metal oxide comprises at least one of ZnO and one or more alkaline earth oxide.

42. The glass of claim 35, further comprising at least one rare earth oxide other than $Y_2O_3$.

43. The glass of claim 35, further comprising at least one of $B_2O_3$, $P_2O_5$, and $TiO_2$.

44. The glass of claim 35, wherein the glass has a strain point of at least 700° C.

45. The glass of claim 35, wherein the glass is ion exchanged.

46. The glass of claim 45, wherein the ion exchanged glass has a compressive layer extending from a surface of the glass to a depth of layer of at least 40 μm into the glass, wherein the compressive layer has a compressive stress of at least 800 MPa.

47. The glass of claim 45, wherein the ion exchanged glass has a 200 gf Vickers hardness of at least 750 kgf/mm$^2$.

48. The glass of claim 46, wherein the compressive layer comprises potassium ions.

49. The glass of claim 35, wherein the glass has a thickness in a range from about 0.1 mm up to about 1.5 mm.

50. The glass of claim 35, wherein the glass is substantially free of $Li_2O$.

* * * * *

UNITED STATES PATENT AND TRADEMARK OFFICE
CERTIFICATE OF CORRECTION

PATENT NO. : 10,501,364 B2
APPLICATION NO. : 14/082673
DATED : December 10, 2019
INVENTOR(S) : Dana Craig Bookbinder et al.

Page 1 of 1

It is certified that error appears in the above-identified patent and that said Letters Patent is hereby corrected as shown below:

In the Claims

In Column 10, Line 13, Claim 35, delete "from about" and insert -- about --, therefor.

In Column 10, Line 20, Claim 36, delete "14 mol" and insert -- 14 mol % --, therefor.

Signed and Sealed this
Tenth Day of March, 2020

Andrei Iancu
*Director of the United States Patent and Trademark Office*